United States Patent [19]

Tanaka et al.

[11] Patent Number: 4,527,876
[45] Date of Patent: Jul. 9, 1985

[54] EXPOSURE CONTROL SHUTTER OF A CAMERA

[75] Inventors: Harumi Tanaka, Kobe; Takashi Iwata, Sakai, both of Japan

[73] Assignee: Minolta Camera Kabushiki Kaisha, Osaka, Japan

[21] Appl. No.: 539,829

[22] Filed: Oct. 7, 1983

[30] Foreign Application Priority Data

Oct. 13, 1982 [JP] Japan .................................. 57-179445
Jan. 14, 1983 [JP] Japan .................................... 58-4857
Jan. 27, 1983 [JP] Japan ................................... 58-12145

[51] Int. Cl.³ ......................... G03B 9/14; G03B 9/40
[52] U.S. Cl. .................................. 354/229; 354/147;
354/247; 354/265
[58] Field of Search ............... 354/147, 226, 229, 230,
354/245–249, 264–266

[56] References Cited

U.S. PATENT DOCUMENTS

| 3,157,100 | 11/1964 | Maitani | 354/226 |
| 3,873,987 | 3/1975 | Brauning | 354/230 X |
| 3,938,168 | 2/1976 | Lange | 354/247 |
| 4,361,387 | 11/1982 | Cloutier | 354/266 X |

Primary Examiner—John Gonzales
Attorney, Agent, or Firm—Watson Cole Grindle & Watson

[57] ABSTRACT

An exposure control shutter of a camera having an exposure opening, comprising first and second plane shutter blades, each shutter blade having a relatively large aperture and a relatively small aperture. The first and second shutter blades, one being disposed top of the other, are slidingly movable with respect to each other from a neutral position in which the camera exposure opening is closed to either a first exposure position in which the relatively large apertures of the first and second shutter blades meet in the camera exposure opening to define a low-speed, large-aperture-size exposure or a second exposure position in which the relatively small apertures meet in the camera exposure opening to define a high-speed, small-aperture-size exposure. A spring is provided for biasing the first and second shutter blades to maintain them in the neutral position. A transmission lever is provided for simultaneously actuating the first and second shutter blades against the spring so as to move them selectively to the first or second exposure position and for simultaneously releasing them to the neutral position.

14 Claims, 17 Drawing Figures

EXPOSURE CONTROL SHUTTER OF A CAMERA

BACKGROUND OF THE INVENTION

1. Field of the Invention

This invention relates to an exposure control shutter of a camera and more particularly to a mechanical shutter which can selectively define one of two stages of exposure in accordance with a photographing mode manually or automatically set.

2. Description of the Prior Art

A mechanical shutter for compact cameras is well known in the prior art, the shutter comprising a pair of shutter blades, one disposed on top of the other and each having an aperture for exposure, capable of being slidingly moved with respect to each other in order to interpose the respective apertures so as to open or close the camera shutter, wherein the exposure can be controlled from a low-speed, fully-open position to a high-speed, slightly-open position by changing the time and size of the opening defined by the interposed apertures of the respective shutter blades. In such a conventional mechanical shutter, it is necessary to use a means for selectively controlling the distances or moving strokes of the shutter blades so as to obtain different apertures, a means for retaining the shutter blades in a predetermined position upon exposure, a means for releasing the retention by the retaining means to allow the return of the shutter blades from an open position, a control circuit for operatively controlling these means, and the like.

SUMMARY OF THE INVENTION

Therefore, an object of the present invention is to provide an improved camera shutter which does not require means such as those mentioned hereinabove.

Another object of the present invention is to provide an improved camera shutter which can selectively define one of two stages of exposure in accordance with a photographing mode manually or automatically set.

According to the present invention, there is provided an exposure control shutter of a camera having an exposure opening, the shutter comprising: first and second plane shutter blades, each shutter blade having a relatively large aperture and a relatively small aperture, the shutter blades being disposed one on top of the other and being slidingly movable with respect to each other from a neutral position to either a first exposure position or a second exposure position, the shutter blades cooperating to close the camera exposure opening in the neutral position, the shutter blades being simultaneously moved in one direction and then in the opposite direction from the neutral position to the first exposure position in which the relatively large apertures of the shutter blades meet in the camera exposure opening to define a low-speed, large-aperture-size exposure, and the shutter blades being also simultaneously moved in a reverse direction from the neutral position to the second exposure position in which the relatively small apertures meet in the camera exposure opening to define a high-speed, small-aperture-size exposure; means for biasing the first and second shutter blades to maintain them in the neutral position; means for simultaneously actuating the first and second shutter blades gainst the bias means so as to move them selectively to the first exposure position or the second exposure position and simultaneously release them to the neutral position; and means for guiding the first and second shutter blades during the movement thereof.

The actuating means may advantageously comprise a reversibly rotatable member having an engaging portion and a pivotable transmission member connected to the first and second shutter blades, part of the transmission member existing in a rotational track of the engaging portion so as to simultaneously move the first and second shutter blades from the neutral position to either the first exposure position or the second exposure position. The actuating means may further comprise a reversible motor for reversibly rotating the rotatable member. The reversible motor can be controlled on the basis of the photographing mode, which may be manually set or automatically set in accordance with the light intensity received. Thus, either of two stages of exposure, i.e., a low-speed, large-aperture-size exposure or a high-speed, small-aperture-size exposure can be selectively obtained in accordance with the rotating direction of the reversible motor.

DESCRIPTION OF THE PREFERRED EMBODIMENTS

Figure 1:
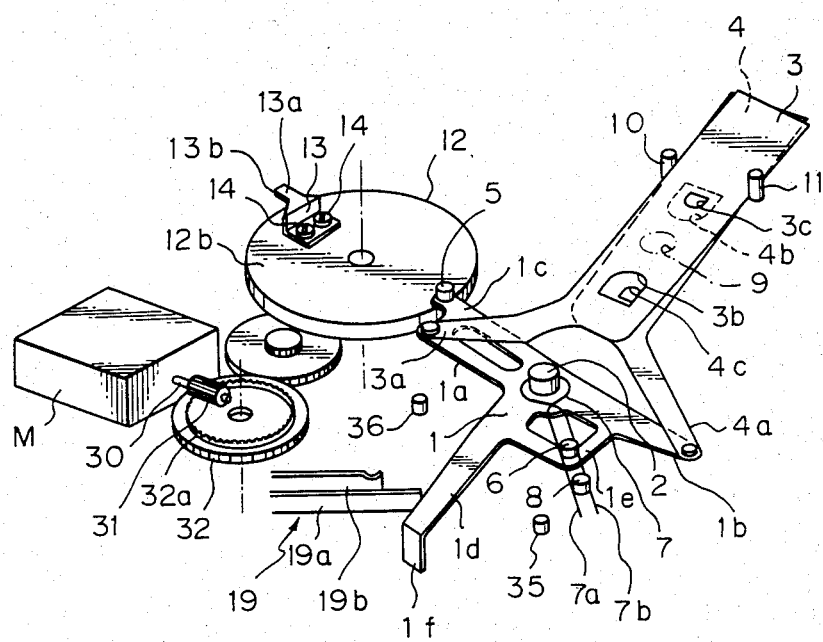
FIG. 1 is a schematic perspective view of a first embodiment of a camera shutter of the present invention.

FIGS. 1 through 4 show an embodiment of an exposure control shutter of a camera according to the present invention. In FIG. 1, a transmission lever 1 is pivotably mounted via a shaft 2 on a base plate (not shown) of the camera on which the shutter of this invention is arranged. The transmission lever 1 actuates the opening or closing of the shutter by a power drive from a motor (explained in detail below).

The lever 1 has a pair of arms 1a and 1b extending from the shaft 2 in opposite directions. To the end of each arm 1a and 1b, a pair of shutter blades 3 and 4 are pivotably connected at an end thereof, respectively. One of the arms 1a of the transmission lever 1 has on the end thereof a projected portion 1c which carries a pin 5 which is arranged to cooperate with a drive mechanism (described in detail later). The transmission lever 1 has another arm portion 1d extending from the central portion of the shaft 2 in a direction which is substantially perpendicular to the above-mentioned pair of arms 1a and 1b and is provided with a downwardly bent portion 1f at the end thereof. The transmission lever 1 also has a branch portion 1e extending between the intermediated portions of the arms 1b and 1d and has a pin 6 rigidly secured thereto. A torsion spring 7 is disposed on and wound around the shaft 2 so that the pin 6 on the branch portion 1e and another pin 8 rigidly secured to the base plate (not shown) are resiliently nipped between respective extensions or elongated portions 7a and 7b of the spring 7. Thereby, the transmission lever 1 is usually retained in a neutral position, as is shown in FIGS. 1 and 2.

Figure 2:
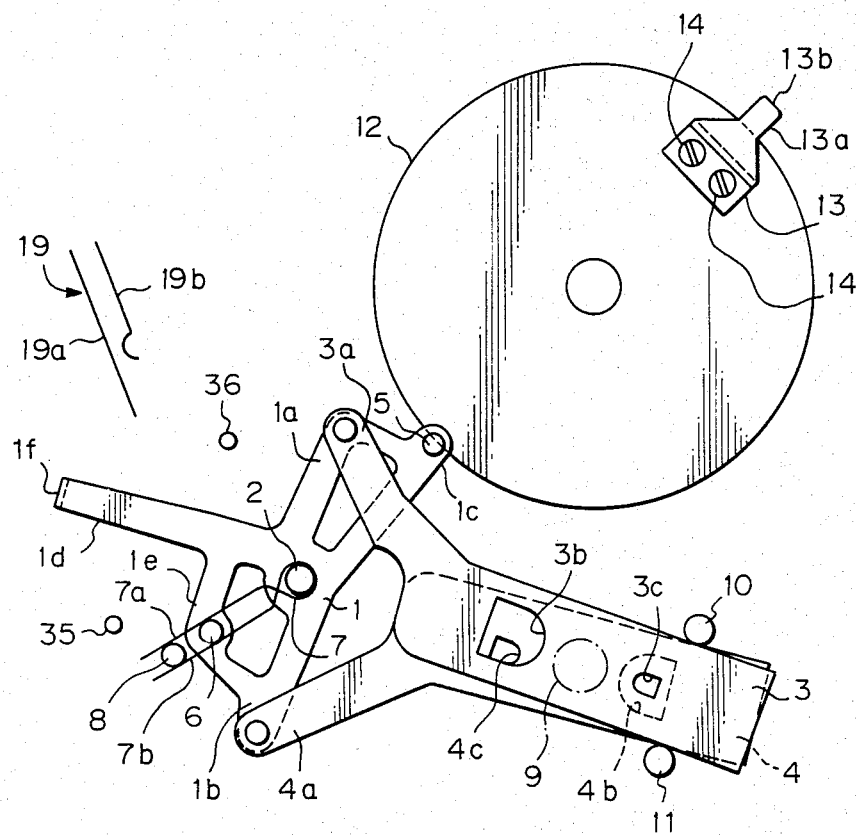
FIG. 2 is a plan view of the embodiment FIG. 1 in a neutral position.

The pair of plane shutter blades 3 and 4, one disposed on top of the other, are longitudinally interposed with respect to each other and have relatively large apertures 3b and 4b and relatively small apertures 3c and 4c, respectively, which are arranged symmetrically with respect to an exposure aperture 9 of the camera lens in a neutral position of the transmission lever 1, as is shown in FIGS. 1 and 2, in which the shutter blades 3 and 4 cooperate to close the camera exposure aperture 9.

When the transmission lever 1 is actuated in either direction, the pair of shutter blades 3 and 4 are guided by means of a pair of guide pins 10 and 11 rigidly secured to the base plate and are slidingly moved in substantially diametrically opposite directions. Thus, at the end of the moving stroke of the shutter blades 3 and 4, the large apertures 3b and 4b or small apertures 3c and 4c meet in the exposure aperture 9 to define a low-speed, large-aperture-size exposure or a high-speed, small-aperture-size exposure, respectively.

In this embodiment, a rotatable disk 12 is journaled on the base plate and can be rotated in either direction by means of a reversible motor M. An actuating member 13 is rigidly mounted by means, such as screws, 14 on the upper face 12b of the rotatable disk 12 in the vicinity of the periphery thereof. The actuating member 13 is slightly bent upwardly, and from the upper end thereof an outwardly protruding portion 13a extends. When the disk 12 rotates, the protruding portion 13a can be engaged with the above-mentioned pin 5 rigidly secured to the projected portion 1c of the transmission lever 1 since the pin 5 is arranged on the track of rotation of the protruding portion 13a. The actuating member 13 may be constructed as an integral part of the rotatable disc 12.

A synchronizing switch 19 can be arranged on the base plate to cooperate with the shutter mechanism so as to simultaneously actuate the flashing of an electronic flash device comprising a movable contact piece 19a and a contact piece 19b. The movable contact piece 19a of the synchronizing switch 19 is arranged on an arc track of the lower bent portion 1f of the lever so that when the transmission lever 1 turns in a clockwise direction so as to exert a low-speed, large-aperture-size exposure the lower bent portion 1f of the lever 1 comes into contact with the movable contact piece 19a and urges it to contact the contact piece 19b.

The drive motor M serves to reversibly rotate the rotatable disk 12 as well as to advance step by step a film disk (not shown) installed in the camera. The drive torque of the motor M is transmitted from a motor shaft 30 through gears 31 and 32 to the rotatable disk 12. The gear 32 is provided with crown gear teeth 32a on the upper face thereof so as to engage with the gear 31. The rotation of the gear 32 is modulated by such means as planetary gear trains (not shown) and is transmitted to the rotatable disk 12, as well as to a film feeding mechanism (not shown), via another transmission route.

A detailed description of the planetary gear mechanism is not given since the planetary gear mechanism has nothing to do with the subject matter of the present invention. It should be noted, however, that the planetary gear mechanism may be constructed so as to drive the film feeder when the photographing exposure is finished and the load on the film feeder is reduced and so as to drive the rotatable disk 12 when the film is stopped after having been wound on a single frame and the load on the film feeder is increased.

The operation of the first embodiment of the present invention illustrated in FIGS. 1 through 4 is now explained. When a release button (not shown) is depressed, the motor M rotates in one direction to rotate the rotatable disc 12 in a clockwise direction from the neutral position illustrated in FIGS. 1 and 2 through the planetary gear mechanism (not shown). The actuating member 13 is integrally rotated in a clockwise direction together with the rotatable disk 12 since it is rigidly secured to the latter. The upper protruding, or engaging, portion 13a of the actuating member 13 engages with the pin 5 provided on the projecting portion 1c of the transmission lever 1 and urges it upward in FIG. 2. Thus, the transmission lever 1 rapidly turns in a counterclockwise direction about the shaft 2 against the spring 7, the extended end portions 7a and 7b of which are enlarged and moved away from each other by the pins 6 and 8 to accumulate a bias force.

Figure 3:
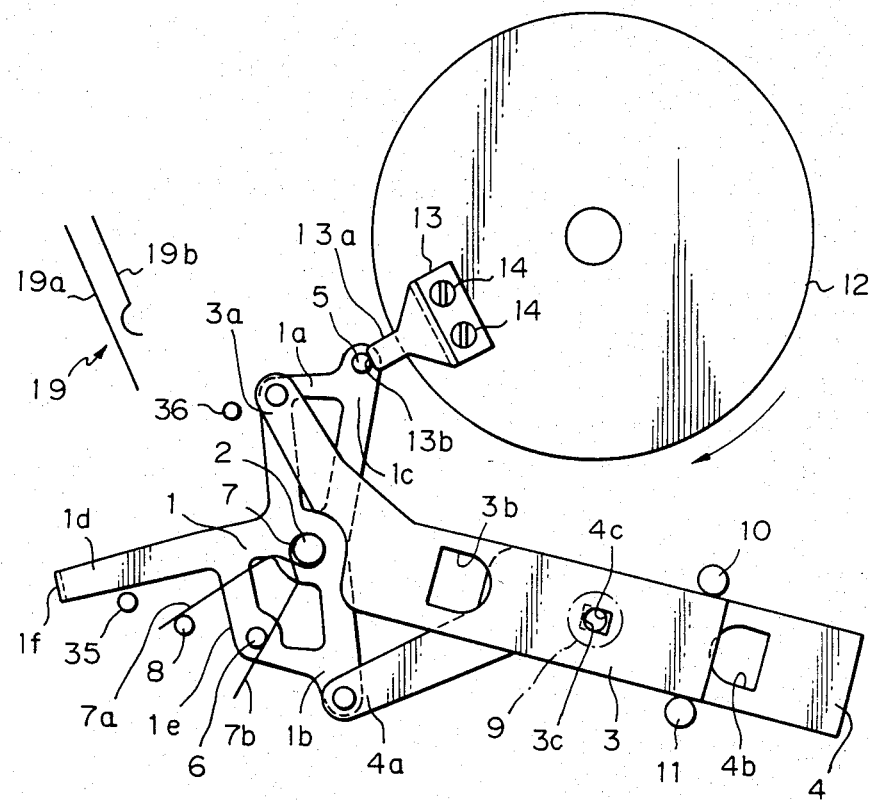
FIG. 3 is a plan view of the embodiment of FIG. 1 under operation to one direction.

After the pin 5 engages with a front edge 13b of the upper protruding portion 13a, as is shown in FIG. 3, and the rotatable disk 12 further rotates in a clockwise direction, the pin 5 disengages from the upper protruding portion 13a and the transmission lever 1 rapidly moves in a clockwise direction with the aid of the biased force of the spring 7 until it stops at the neutral position shown in FIG. 2.

During such a reciprocal movement of the transmission lever 1, the shutter blades 3 and 4 pivotably connected to the arm portions 1a and 1b of the lever 1, respectively, are guided by means of guide pins 10 and 11 and are slidingly and reciprocally moved in opposite directions. Consequently, the shutter blade 3 is pulled toward the transmission lever 1, and the shutter blade 4 is pushed in the opposite direction. Thus, the relatively small aperture 3c and 4c provided on the shutter blades 3 and 4, respectively, meet and are aligned in the camera exposure aperture 9 so as to establish a high-speed, small-aperture-size exposure. The shutter is closed by returning the shutter blades 3 and 4 to the neutral position just after the actuating member 13 disengages from the pin 5 of the transmission lever 1. The rotatable disk 12 further rotates in a clockwise direction until it completes one rotation and stops at the initial position for preparing the next photographing shot exposure.

When the release button (not shown) is depressed, if the motor M rotates in a reverse direction, the rotatable disk 12 is thus rotated in a counterclockwise direction from the neutral position illustrated in FIGS. 1 and 2 and the actuating member 13 is also rotated in a counterclockwise direction together with the rotatable disk 12. The upper protruding portion 13a of the engaging or actuating member 13 engages with the pin 5 provided on the projecting portion 1c of the transmission lever 1 and urges it downward in FIG. 2. Therefore, the transmission lever 1 rapidly turns in a clockwise direction about the shaft 2 against the spring 7, the extended end portions 7a and 7b thereof being biased away from each other by means of the pins 6 and 8.

Figure 4:
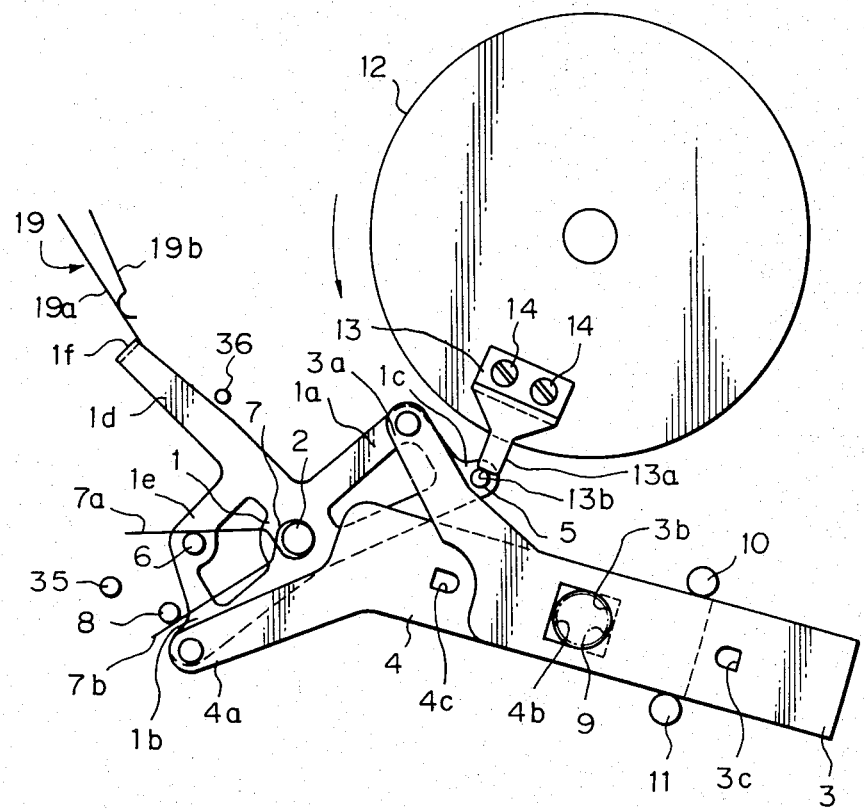
FIG. 4 is a plan view of the embodiment of FIG. 1 under operation to the reverse direction.

After the pin 5 engages with the front edge 13b of the upper protruding portion 13a, as is shown in FIG. 4, the rotatable disk 12 further rotates in a counterclockwise direction, the pin 5 disengages from the upper protruding portion 13a and the transmission lever 1 moves in a counterclockwise direction with the aid of the returning force of the spring 7 until it stops at the neutral position shown in FIG. 2.

During such a reciprocal movement of the transmission lever 1, the shutter blades 3 and 4 pivotably connected to the arm portions 1a and 1b of the lever 1, respectively, are guided by means of the guide pins 10 and 11 and are slidingly and recipiocally moved in opposite directions. In this case, however, the moving directions of the shutter blades 3 and 4 are the reverse of those hereinbefore described, respectively. Consequently, the shutter blade 4 is pulled toward the transmission lever 1, and the shutter blade 3 is pushed in the opposite direction. Thus, the relatively large apertures 3b and 4b provided on the shutter blades 3 and 4, respectively, meet and align in the camera exposure aperture 9 so as to establish a low-speed, large-aperture-size exposure. The shutter is then closed by returning the shutter blades 3 and 4 to the neutral position just after the actuating member 13 disengages from the pin 5 of the transmission lever 1. The rotatable disk 12 further rotates in a counterclockwise direction until it completes one rotation and stops at the initial position for preparing the next photographing shot.

When the transmission lever 1 rotates in a clockwise direction so as to establish a low-speed, large-aperture-size exposure, the downwardly bent portion 1f of the arm 1d of the transmission lever 1 engages with the movable contact piece 19a and urges it to contact the contact piece 19b just when the low-speed, large-aperture-size shutter is opened by the alignment of the relatively large apertures 3b and 4b of the shutter blades 3 and 4, respectively, in the camera exposure opening. At this moment, therefore, the electronic flash device (not shown) flashes so that a synchronizing photographing shot is established if a power source switch (not shown) of the electromic flash device has been manually or automatically turned on in advance.

Figure 5:
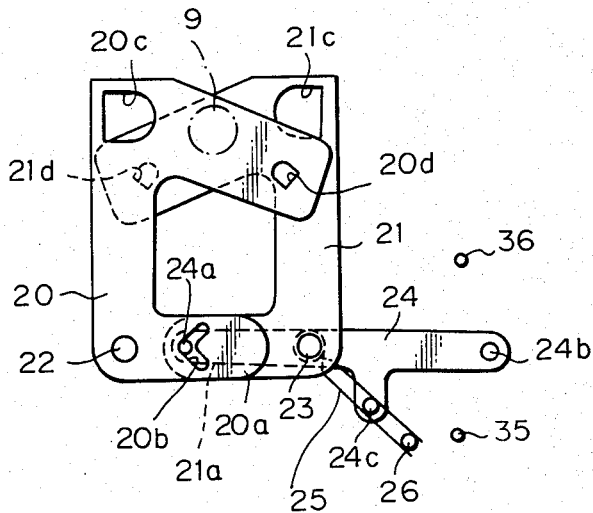
FIG. 5 is a plan view of a second embodiment of a camera shutter of the present invention illustrating shutter blades in a neutral position.
Figure 6:
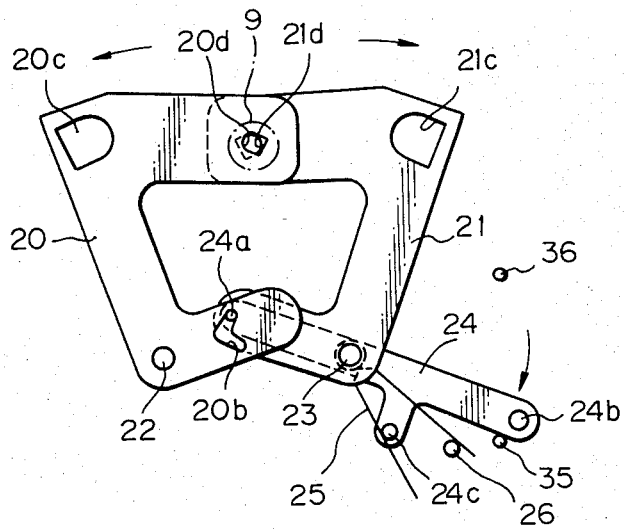
FIG. 6 is a plan view of the embodiment of FIG. 5 in an exposure position.
Figure 7:
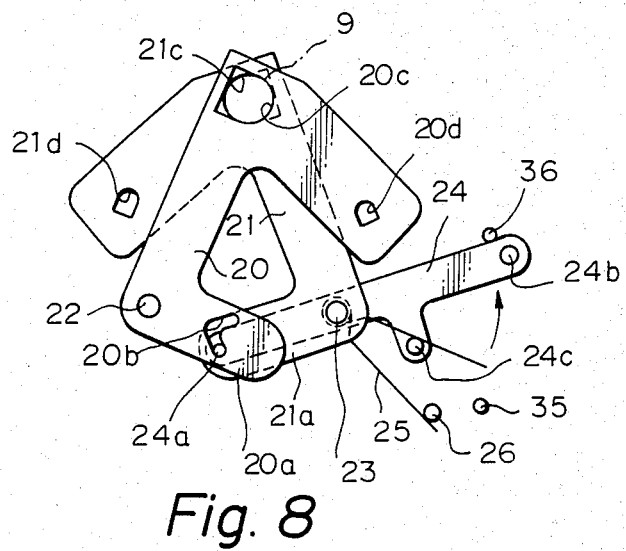
FIG. 7 is a plan view of the embodiment of FIG. 5 in another exposure position.

Another embodiment of a shutter blade mechanism is illustrated in FIGS. 5 through 7. In this embodiment, the shape of the shutter blades is different from that of the first embodiment explained hereinbefore. This embodiment is also different from the first embodiment in that the shutter blades do not move linearly but instead rotate. In this embodiment, however, the actuating means, such as the rotatable disk, drive motor, actuating member, and the like (described with reference to the first embodiment) can also be employed.

A pair of plain shutter blades 20 and 21 each have a substantially U-shaped configuration and are provided with first end portions 20a and 21a, respectively, and second end portions. The shutter blades 20 and 21 are pivotably mounted at the corners in the vicinity of the first ends 20a and 21a on shafts 22 and 23, respectively, rigidly secured to the base plate in such a manner that they are symmetrically arranged, one upon another by the parts thereof, so as to slidingly move with respect to each other. The shutter blades 20 and 21 are provided with relatively large apertures 20c and 21c at the corners in the vicinity of the second ends thereof, respectively, and relatively small apertures 20d and 21d at the second ends thereof, respectively. A transmission lever 24 has at one end thereof a pin 24b rigidly secured thereto which is kicked by the actuating member 13 (FIG. 1) in the same manner as the first embodiment. The transmission lever 24 is pivotably mounted on the base plate by means of the above-mentioned shaft 23 of the shutter blade 21 and is resiliently retained in a neutral position by a torsion spring 25 which is disposed on and wound around the shaft 23 so that a pin 24c mounted on the transmission lever 24 and another pin 26 rigidly secured to the base plate are resiliently nipped together between respective extensions or elongated portions of the spring 25.

In a neutral position, the shutter blades 20 and 21 are superimposed on and cross to each other at the respective intermediate portions between the large aperture 20c and the small aperture 20d and between the large aperture 21c and small aperture 21d, respectively, so as to close a camera exposure opening 9 as seen in FIG. 5. The transmission lever 24 has another pin 24a at the other end thereof, which pin 24a extends through a hole formed in the first end 21a of the shutter blade 21 into an L-shaped cam slit 20b formed in the first end 20a of the shutter blade 20.

In the same manner as in the first embodiment, when the rotatable disk 12 (FIG. 1) rotates in accordance with the photographing mode in either direction and an actuating member 13 also rotates in the same direction (not shown in FIGS. 5 through 7) the pin 24b of the lever 24 is kicked by the actuating member in either direction. If the pin 24b is kicked downward from the position illustrated in FIG. 5, the lever 24 rapidly rotates in a clockwise direction about the shaft 23, as is shown in FIG. 6, and enlarges the spring 25 by the pins 24c and 26 to accumulate a spring bias force. After the lever 24 comes into contact with the regulating pin 35 provided on the base plate, it rotates in a counterclockwise direction and returns to the neutral position with the help of the bias force of the spring 25. Due to such a reciprocal movement of the lever 24 accompanying the pin 24a, the shutter blade 21 rotates about the shaft 23 in a clockwise direction and the shutter blade 20 rotates about the shaft 22 in a counterclockwise direction as a result of the pin 24a engaging with the cam slit 20b and moving on an arcuate track around the shaft 23. During this reciprocal movement of the shutter blades 20 and 21, the relatively small apertures 20d and 21d are superimposed with respect to each other on the camera exposure opening 9 so as to exert a high-speed, small-aperture size exposure of photographing, as is shown in FIG. 6. Upon movement of the transmission lever 24 in a counterclockwise direction, the shutter blades 20 and 21 close the exposure opening 9 and return to the initial neutral position, as is shown in FIG. 5.

If the pin 24b is kicked upward from the neutral position illustrated in FIG. 5, the lever 24 rapidly rotates in a counterclockwise direction about the shaft 23, as is shown in FIG. 7 and enlarges the spring 25 by the pins 24c and 26 to accumulate a spring bias force. After the lever 24 comes into contact with the regulating pin 36 provided on the base plate, it rotates in a clockwise direction and returns to the neutral position with the aid of the bias force of the spring 25. Due to such a reciprocal movement of the lever 24 accompanying with the pin 24a, the shutter blade 21 rotates about the shaft 23 in a counterclockwise direction, and the shutter blade 20 rotates about the shaft 22 in a clockwise direction as a result by means of the pin 24a engaging with the cam slit 20b and moving on an arcuate track around the shaft 23. During this reciprocal movement of the shutter blades 20 and 21, the relatively large apertures 20c and 21c are superimposed with respect to each other on the camera exposure opening 9 so as to exert a low-speed, large-aperture size exposure of photographing, as is shown in FIG. 7. Upon movement of the transmission lever 24 in a clockwise direction, the shutter blades 20 and 21 close the exposure opening 9 and return to the initial neutral position as is shown in FIG. 5.

Still another embodiment of the present invention is described in detail with reference to FIGS. 8 through 13, wherein elements or parts similar to or identical to those in the first embodiment are designated by the same reference numerals. These elements or parts are not explained in detail since the construction and function thereof correspond to those in the first embodiment shown in FIGS. 1 through 4.

A rotatable disk 112 is journaled on a base plate and can be rotated in either direction by means of a reversible motor M. An actuating member 113 is rotatably and coaxially mounted on the rotatable disk 112 in such a manner that a flange portion 112a of the disk 112 is fit into an annular rib 113f of the actuating member 113. The actuating member 113 comprises: an upwardly and outwardly projected portion 113a, the tip thereof being engageable with the pin 5 provided on the above-mentioned projection 1c of the transmission lever 1; a radially outwardly protruding portion 113c, the tip thereof being extented beyond the outer periphery of the disk 112; and an upwardly projecting portion 113b which cooperates with an upwardly projected portion 112b of the disk 112 in such a manner that a torsion spring 114 disposed on and around the annular rib 113f traverses both the portions 112b and 113b, as is shown in FIGS. 8 and 9, with its respective ends 114a and 114b, which resiliently nip the portions so that the actuating member 113 rotates together with the rotatable disk 112.

Adjacent to the rotatable disk 112, an engaging lever 15 is pivotably mounted on the base plate by its shaft 16, on which a coil spring 17 is disposed so that a downwardly extending tip 15a of the lever 15 is urged to contact the periphery of the rotatable disk 112 and engage with first and second projections 112c and 112d provided thereon (explained hereinafter). The lever 15 can also engage with an outwardly projecting portion 113c of the actuating member 113 but disengages therefrom when the lever 15 outwardly escapes upon engagement with the first or second projection 112c and 112d.

Figure 8:
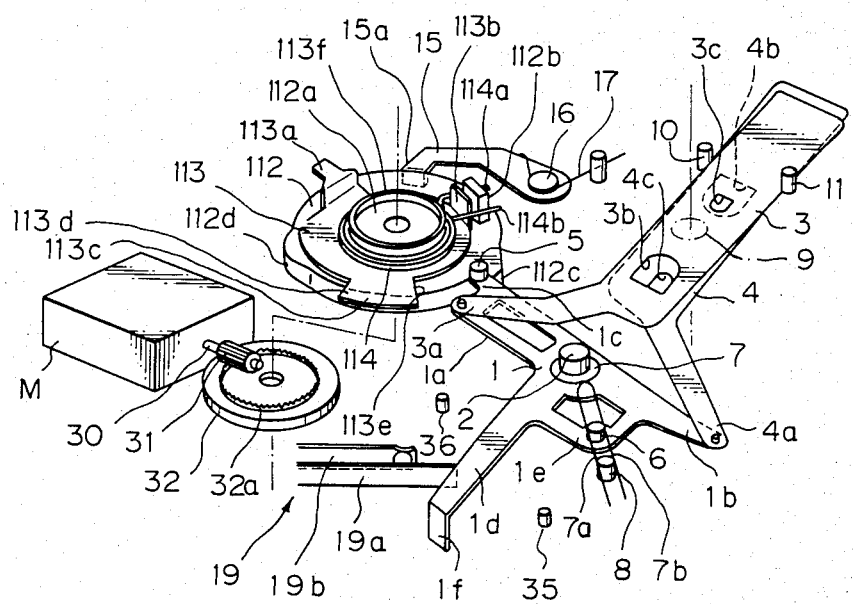
FIG. 8 is a schematic perspective view of a third embodiment of a camera shutter of the present invention.
Figure 9:
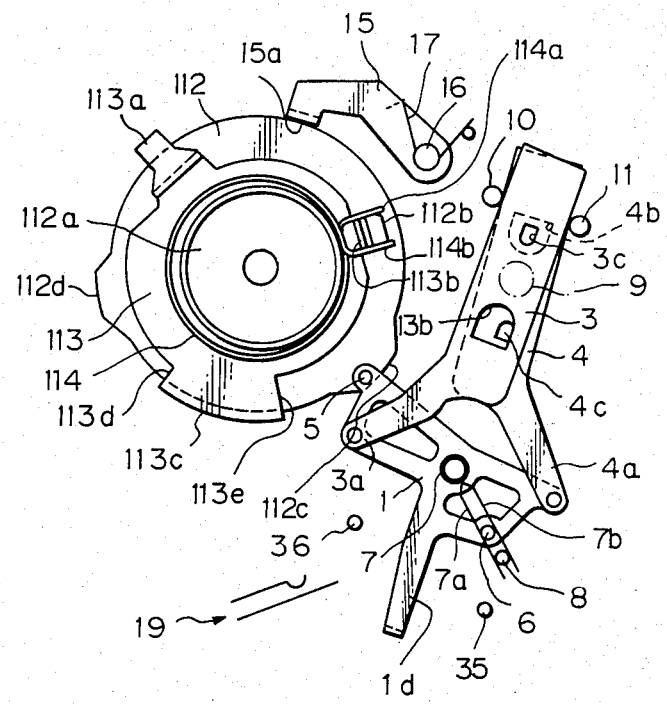
FIG. 9 is a plan view of the embodiment of FIG. 8 in a neutral position.

When a release button (not shown) is depressed, the motor M rotates in one direction so as to rotate the rotatable disk 112 in a clockwise direction from the initial position illustrated in FIGS. 8 and 9 through a planetary gear mechanism (not shown). The actuating member 113 also rotates in a clockwise direction together with the disk 112 since the actuating member 113 is connected to and held by the disk 112 due to the spring 114 nipping the projected portion 113b and the projected portion 112b.

Figure 10:
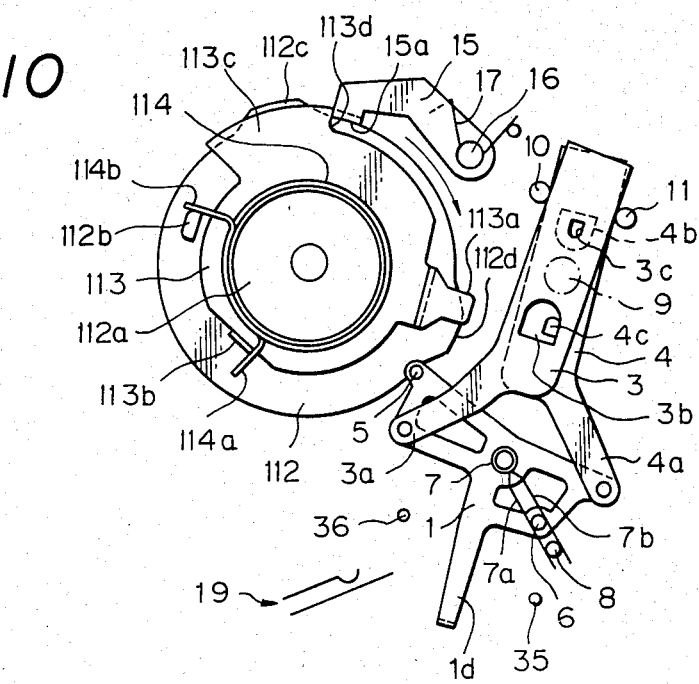
FIG. 10 is a plan view of the embodiment of FIG. 8 under operation at first stage to one direction.

The engaging projection 113c of the actuating member 113 then comes into contact by its first edge 113d with the engaging lever 15 to stop the actuating member 113 per se just before the projecting 113a thereof engages with the pin 5 of the transmission lever 1, as is shown in FIG. 10. Further rotation of the disk 112 in a clockwise direction increases the distance between the respective ends 114a and 114b of the spring 114 so as to accumulate a bias force thereof since one end 114a of the spring 114 is held unmovable by the projection 113b of the actuating member 113 and the other end 114b is biased by the projected portion 112b of the disk 112.

Figure 11:
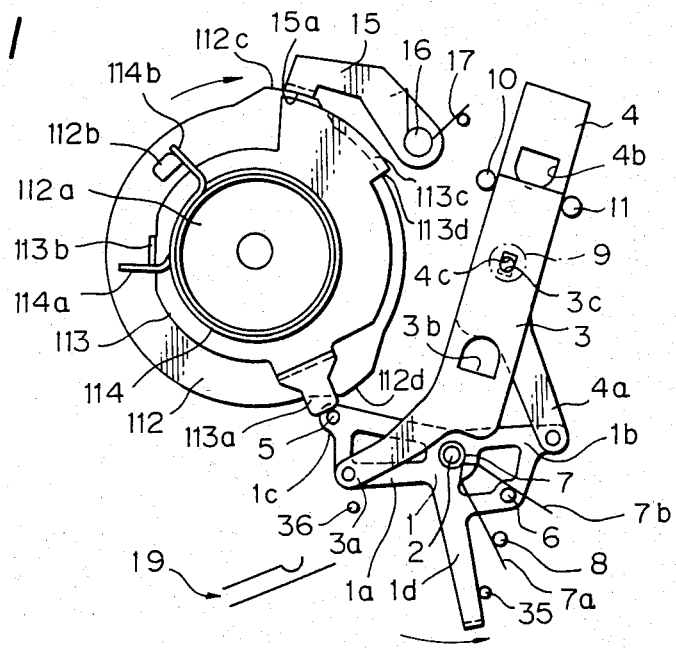
FIG. 11 is a plan view of the embodiment of FIG. 8 under operation at second stage to said one direction.

Then the first projected portion 112c of the disk 112 engages with the lever 15 in such a manner that the latter turns in a clockwise direction about the shaft 16 thereof against the bias force of the spring 17 and escapes outwardly, thereby disengaging the first edge 113d of the engaging projection 113c from the lever 15, as is shown in FIG. 11. At this time, the actuating member 113 rapidly rotates in a clockwise direction with the aid of the biased spring 114 and the projection 113a thereof kicks the pin 5 of the transmission lever 1 downwardly, as is shown in FIG. 11. Thereby, the transmission lever 1 rapidly rotates about the shaft 2 in a counterclockwise direction against the bias force of the spring 7 until the arm portion 1d thereof comes into contact with the first regulating pin 35. Then the transmission 1 returns to the initial neutral position by means of the spring 7 which returns from the position where the respective ends 7a and 7b thereof are enlarged by the pins 6 and 8. During such a reciprocal movement of the transmission lever 1, a high-speed, small-aperture size exposure is exerted in the same manner as explained hereinbefore.

Figure 12:
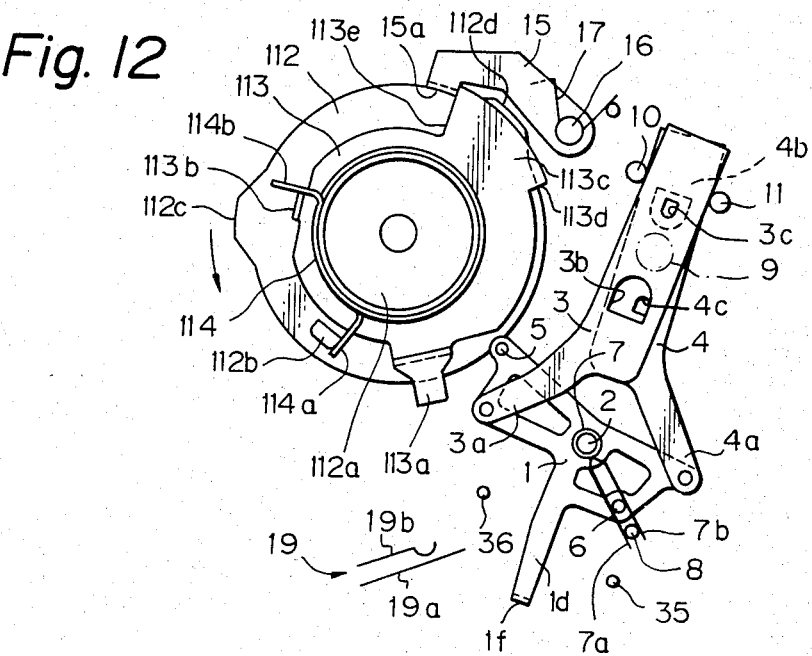
FIG. 12 is a plan view of the embodiment of FIG. 8 under operation at first stage to the reversed direction.

Upon the release of the release button (not shown), if the motor M rotates in a reverse direction, the rotatable disk 112 and the actuating member 113 rotate together about the same axis in a counterclockwise direction from the initial position illustrated in FIGS. 8 and 9, in a manner similar to that described above. The engaging projection 113c of the actuating member 113 then comes into contact by its second edge 113e with the engaging lever 15 to stop the actuating member 113 per se just before the projection 113a thereof engages with the pin 5 of the transmission lever 1, as is shown in FIG. 12. Further rotation of the disk 112 in a counterclockwise direction increases the distance between the respective ends 114a and 114b of the spring 114 so that a bias force thereof is accumulated since one end 114b of the spring 114 is held unmovable by the projection 113b of the actuating member 113 and the other end 114a is biased by the projection 112b of the disk 112.

Figure 13:
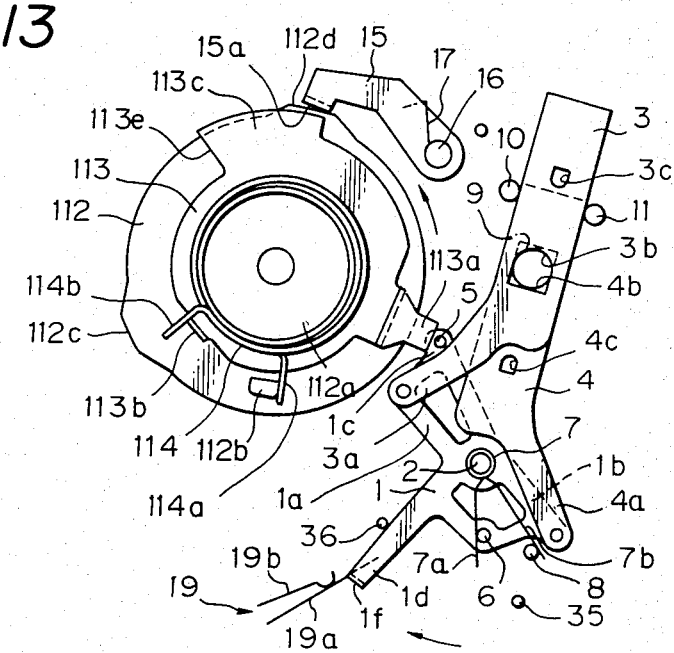
FIG. 13 is a plan view of the embodiment of FIG. 8 under operation at second stage to said reversed direction.

Then the second projected portion 112d of the disk 112 engages with the lever 15 in such a manner that the latter turns in a clockwise direction about the shaft 16 thereof against the bias force of the spring 17 and escapes outwardly, thereby disengaging the second edge 113e of the engaging projection 113c from the lever 15, as is shown in FIG. 13. At this moment, the actuating member 113 rapidly rotates in a counterclockwise direction with the aid of the biased force of the spring 114 and the projection 113a thereof kicks the pin 5 of the transmission lever 1 upwardly, as is shown in FIG. 13. Thereby, the transmission lever 1 rapidly rotates about the shaft 2 in a clockwise direction against the bias force of the spring 7 until the arm portion 1d thereof comes into contact with the second regulating pin 36. Then the transmission lever 1 returns to the initial neutral position by means of the spring 7 which returns from the position where the opposite ends 7a and 7b thereof are enlarged by the pins 6 and 8. During such a reciprocal movement of the transmission lever 1, a low speed, large-aperture size exposure is exerted, in a manner opposite to that explained above.

As can be easily understood, the rotational speed of the engaging member 113 in this embodiment is increased much more than the rotational speed of the rotatable member 112 when the engaging member 113 kicks the pin 5 of the transmission lever 1 to exert an exposure shot.

Figure 14:
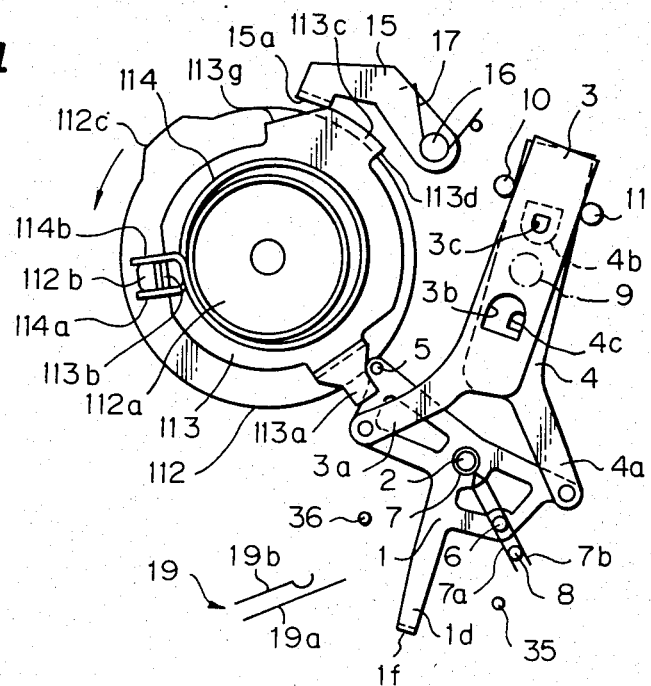
FIG. 14 is a plan view of a fourth embodiment of a camera shutter similar to the embodiment shown in FIGS. 8 through 13, under operation at first stage to one direction.
Figure 15:
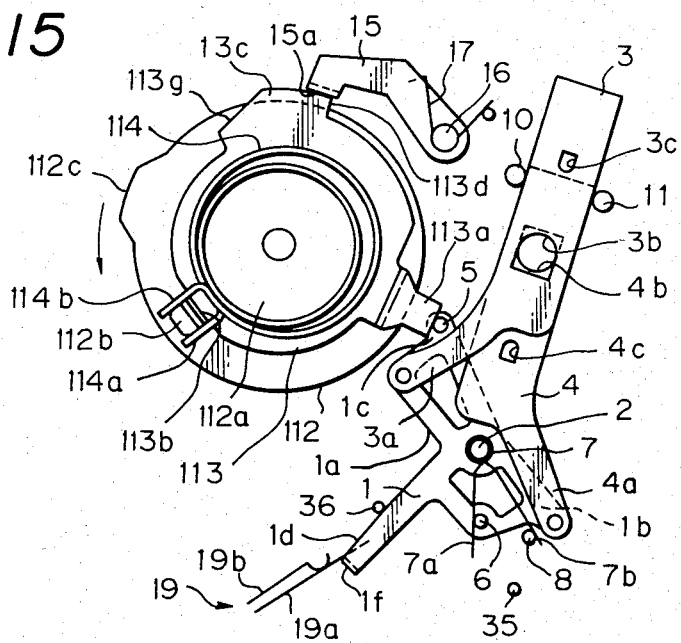
FIG. 15 is a plan view of the embodiment of FIG. 14 under operation at second stage to said one direction.

In FIGS. 14 and 15, a fourth embodiment of a camera shutter of the present invention is illustrated, the embodiment being similar to the last-mentioned embodiment but different therefrom in that the rotational speed of the engaging member 113 is increased only when it rotates in a direction in which a high-speed, small-aperture-size exposure is exerted.

In this embodiment, the outwardly protruding engaging portion 113c of the actuating member 113 is provided at the counterclockwise end thereof with an inclined cam face 113g, as is shown in FIGS. 14 and 15. When the rotatable disk 112 rotates in a counterclockwise direction so as to exert a low-speed, large-aperture-size exposure, the inclined cam face 113g of the engaging portion 113c comes into contact with the lever 15. However, the coefficients of the springs 17 and 114 and the contact angle of the inclined cam face 113g with the tip portion 15a of the lever 15 are advantageously selected in such a manner that the lever 15 is urged outwardly in a clockwise direction against the spring 17 to allow the actuating member 113 to rotate together with the rotatable disk 112, as is shown in FIG. 15. Therefore, in this case, rotational speed of the actuating member 113 is not increased, i.e., it is the same as the rotational speed of the rotatable disk 112. Contrary to this, when the rotatable disk 112 rotates in a clockwise direction so as to exert a high-speed, small-aperture-size exposure, the rotational speed of the actuating member 113 is increased in the same manner as that of the last-mentioned embodiment.

Figure 16:
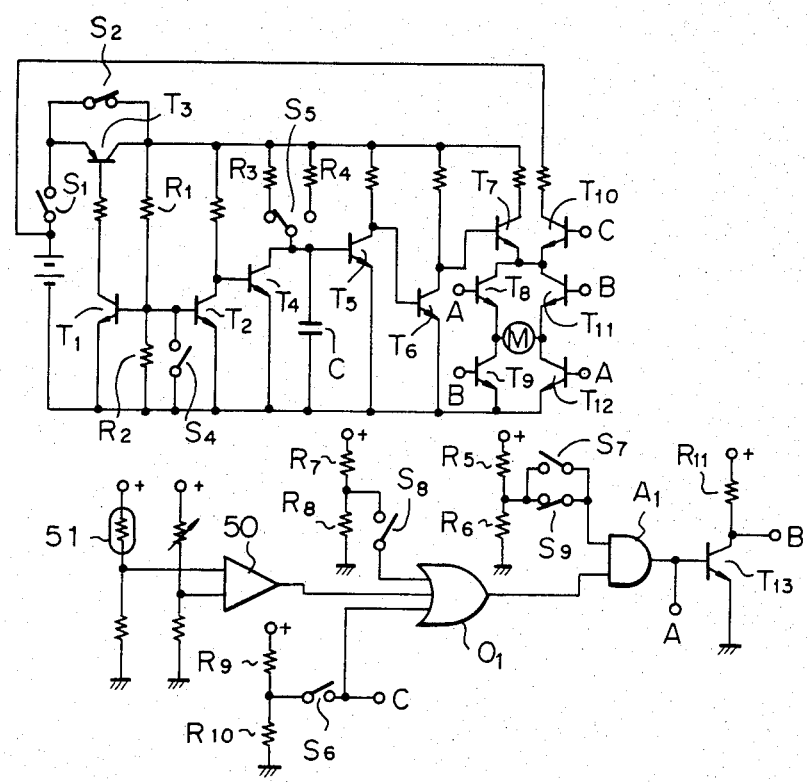
FIG. 16 is a block diagram illustrating an embodiment of a control circuit for controlling the camera shutter of the present invention; and, FIG. 17 is a block diagram illustrating another embodiment of a control circuit for controlling the camera shutter, which embodiment being similar to the embodiment shown in FIG. 16.
Figure 17:
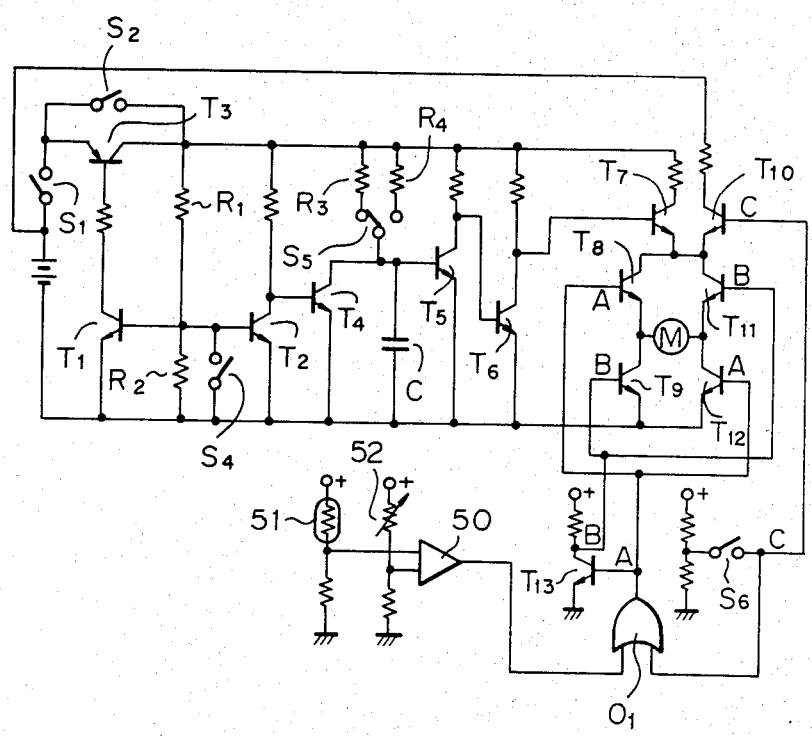

FIGS. 16 and 17 are block diagrams illustrating embodiments of an electric circuit which determines the rotational direction of the rotatable disk 12 or 112 or the rotational direction of the motor M in order to select either a high-speed, small-aperture-size exposure or a low-speed, large-aperture-size exposure, in accordance with manual control or automatical control in response to received light itensity.

In FIG. 16, a main switch $S_1$ is mechanically connected with a dustproofing cover member (not shown) which is movable along a front wall of a camera housing between a closed position in closing registry with a picture taking lens and an open position offset from the axis of the picture taking lens so that the main switch $S_1$ is closed in response to the movement of the cover member from its closed to open position.

When the release button (not shown) is depressed while the main switch $S_1$ being closed, a release switch $S_2$ is closed and thereby the divided voltage of the resistances $R_1$ and $R_2$ is input into the bases of the transistors $T_1$ and $T_2$, respectively, which transistors $T_1$ and $T_2$ become conductive. When the transistor $T_1$ becomes conductive, a transistor $T_3$ also becomes conductive. Therefore, power input into the circuit is reserved even after the release button is detached and the release switch $S_2$ is opened.

On the other hand, when the transistor $T_2$ becomes conductive, a transistor $T_4$, the base thereof being connected to the collector of the transistor $T_2$, becomes non-conductive. When the transistor $T_4$ becomes conductive, the capacitor C is charged through the resistance $R_3$ and the switch $S_5$. The switch $S_5$ is a self-timer setting switch which is connected to the resistance $R_4$ when the self-timer is setting so that the capacitor C is charged through the resistance $R_4$ and the switch $S_5$. In this case, however, the time for charging the capacitor C is long since the resistance $R_4$ is larger than the resistance $R_3$.

When the capacitor C gets charged at a predetermined voltage, a transistor $T_5$ becomes conductive, the capacitor C being connected between the base and emitter of the transistor $T_5$. A transistor $T_6$ thus becomes non-conductive, the base thereof being connected to the collector of the transistor $T_5$, and a transistor $T_7$ becomes conductive, the base thereof being connected to the collector of the transistor $T_6$.

The emitter of the transistor $T_7$ is connected to the collectors of transistors $T_8$ and $T_{11}$, respectively, and between the emitters of the transistors $T_8$ and $T_{11}$ is connected a motor M which rotates the above-mentioned rotatable disk 12 or 112 as well as exerts the widing up of film strip when a clutch mechanism having planetary gear trains is so shifted. In addition, the emitter of the transistor $T_8$ is connected to the collector of a transistor $T_9$, and the emitter of the transistor $T_{11}$ is connected to the collector of a transistor $T_{12}$. The emitters of the transistors $T_9$ and $T_{12}$ are connected to the ground of circuit.

Thus, it is possible to change the direction of the current flowing in the motor M, thereby reversing the rotational direction of the motor M, by changing the voltage of the bases of the transistors $T_8$, $T_9$, $T_{11}$, and $T_{12}$, while transistor $T_7$ being conductive.

A comparator 50 comprises two inputs, one being for exposure information including received light intensity from a photographing object detected by an optical diode 51 and the other being for other exposure information manually set. A "high" signal in the case of high intensity or a "low" signal in the case of low intensity is input into an OR circuit $O_1$. The switches $S_4$, $S_6$, and $S_7$ are opened at the completion of film winding and are closed when the shutter is closed after exposure. Therefore, these switches are all open while the photographing is being extended and closed while the winding up of the film strip is being carried out.

First, assuming that the camera photographing mode is now set at automatic-photographing, a switch $S_8$ is opened, and a switch $S_9$ is closed. The divided voltage of the resistance $R_5$ and $R_6$ is input into a first input of an AND circuit $A_1$ through a switch $S_9$.

If the object to be photographed has a high light intensity, a "high" signal is input into the OR circuit $O_1$ and then into the second input of the AND circuit $A_1$. The output of the AND circuit $A_1$ is connected to an output terminal A and the base of a transistor $T_{13}$. Therefore, a "high" signal is output from the output terminal A. At the same time, the transistor $T_{13}$ becomes conductive so that a "low" signal is output from an output terminal B which is connected to the collector of the transistor $T_{13}$. The output terminal A is connected to the bases of the above-mentioned transistors $T_8$ and $T_{12}$, to which the motor M is connected. The output terminal B is connected to the bases of the transistors $T_9$ and $T_{11}$. Therefore, the transistors $T_8$ and $T_{12}$ are conductive and the transistors $T_9$ and $T_{11}$ are non-conductive so that electric current flows from the transistor $T_8$ through the motor M to the transistor $T_{12}$. Thereby, the motor M rotates in a positive direction to drive the above-mentioned rotatable disk 12 or 112 in the direction to high-speed small-aperture-size exposure of the shutter.

If the object to be photographed has a low light intensity, a "low" signal is input into the OR circuit and then into a second input of the AND circuit $A_1$, which outputs a "low" signal, since the switches $S_6$ and $S_8$ connected to the remaining inputs of the OR circuits $O_1$ are opened so that the signals input into the OR circuit $O_1$ are all low level. Therefore, a "low" signal is output from the output terminal A, and the transistor $T_{13}$ becomes non-conductive so that "high" signal is output from the output terminal B connected to a positive electrode via a resistance $R_{11}$.

Thus, contrary to the case of high light intensity, the transistors $T_9$ and $T_{11}$ are conductive and the transistors $T_8$ and $T_{12}$ are non-conductive so that an electric current flows from the transistor $T_{11}$ through the motor M to the transistor $T_9$. Thereby, the motor M rotates in a negative or reverse direction to rotate the above-mentioned rotatable disk 12 or 112 in the direction to low-speed, large-aperture-size exposure of the shutter.

Now, assuming that the camera photographing mode is set at manual photographing and that the camera is manually set at high-speed, small-aperture-size exposure of the shutter, the switches $S_8$ and $S_9$ are both closed. The divided voltage of the resistances $R_7$ and $R_8$ is thus input into the OR circuit $O_1$ via the switch $S_8$, and a "high" signal is input from the OR circuit $O_1$ into the second input of the AND circuit $A_1$ regardless of the signal from the comparator 50. On the other hand, since the divided voltage of the resistances $R_5$ and $R_6$ is input into the first input of the AND circuit $A_1$ through the switch $S_9$, the AND circuit $A_1$ outputs a "high" signal. Thereby, the motor M rotates in the direction to rotate the rotatable disk 12 or 112 in the direction to high-speed, small-aperture-size exposure of the shutter in the same manner as the case of high intensity automatic photographing.

If the camera is manually set at high-speed, large-aperture-size exposure of the shutter, the switches $S_8$ and $S_9$ are both opened. The divided voltage of the resistances $R_5$ and $R_6$ is thus no longer input into the first input of the AND circuit $A_1$ which outputs a "low" signal, regardless of the input signal from the comparator 50 via the OR circuit $O_1$. Thereby, the motor M rotates in a reverse direction to rotate the disk 12 or 112 in the direction to low-speed, large-aperture-size exposure in the same manner as in the case of low intensity automatic photographing.

Upon completion of exposure and closing of the shutter, the clutch mechanism is shifted in accordance with a signal designating that the shutter is closed so that the drive of the motor M is transmitted to the film winding mechanism, and the switches $S_4$, $S_6$, and $S_7$ are all closed.

When the switch $S_4$ is closed, the transistors $T_1$ and $T_2$ become non-conductive. When the transistor $T_1$ becomes non-conductive, the transistor $T_3$ also becomes non-conductive so that the power supply is no longer reserved. When the transistor $T_2$ becomes non-conductive, the transistor $T_4$ becomes conductive to allow the capacitor C to discharge the loaded capacity. Thereby, the transistors $T_5$ and $T_7$ become non-conductive.

When the switch $S_6$ is closed, the divided voltage of the resistances $R_9$ and $R_{10}$ is input into the OR circuit $O_1$ as a "high" signal and is input into the base of the transistor $T_{10}$ from the output terminal C. Thereby, the transistor $T_{10}$ becomes conductive. When a "high" signal is input into the OR circuit $O_1$, a "high" signal is input from the OR circuit $O_1$ into the AND circuit $A_1$ regardless of the signal from the comparator 50. In addition, when the switch $S_7$ is closed, the divided voltage of the resistances $R_5$ and $R_6$ is input into the AND circuit $A_1$ as a "high" signal, which is in turn output from the AND circuit $A_1$. Thereby, a "high" signal is output from the output terminal A and a "low" signal is output from the ouptut terminal B. Thus, the transistors $T_8$ and $T_{12}$ becomes conductive.

Therefore, electric current flows in the motor M from the transistor $T_{10}$ toward the transistors $T_8$ and $T_{12}$ so that the motor M rotates in one direction regardless of the condition of the switches $S_8$ and $S_9$ in accordance with the set mode and the light intensity of the to be object photographed.

This motor rotation serves to advance the film disk. When this action is completed, the switch $S_6$ is opened and a "low" signal is input from the output terminal C into the base of the transistor $T_{10}$. Thereby, the transistor $T_{10}$ becomes non-conductive and the power supply to the motor M is stopped to stop it. At the same time, the switches $S_4$ and $S_7$ are opened and the clutch mechanism is shifted so that the drive of the motor M can be transmitted to the shutter blade mechanism for the next exposure shot.

If the release switch $S_2$ is already closed when the switch $S_4$ is opened just after the completion of film winding, a photographing shot is repeated again. This means that continuous photographing can be attained by countinuous depressing the release button.

In FIG. 17, another embodiment of an electric circuit is illustrated, the embodiment being similar to the above-mentioned embodiment, wherein elements or parts identical to those in the embodiment of FIG. 16 are designated by the same reference symbols or numerals. This embodiment of an electric circuit is intended to be used for automatically selecting either a high-speed, small-aperture-size exposure or a low-speed, large-aperture-size exposure of the shutter. Therefore, there is no AND circuit $A_1$ as in FIG. 16, and the output of the OR circuit $O_1$ is directly transmitted to a terminal A, as is shown in FIG. 17. In addition, neither circuits including the resistances $R_7$ and $R_8$ and the switch $S_8$ nor circuits including the resistances $R_5$ and $R_6$ and the switches $S_7$ and $S_9$ are provided.

We claim:

1. An exposure control shutter of a camera having an exposure opening, wherein said shutter comprises: first and second plane shutter blades, each shutter blade having a relatively large aperture and a relatively small aperture, said shutter blades being disposed one on top of the other and being slidingly movable with respect to each other from a neutral position to either a first exposure position or a second exposure position, said shutter blades cooperating to close said camera exposure opening in said neutral position, said shutter blades being simultaneously moved in one direction and then in the opposite direction from said neutral position to said first exposure position in which said relatively large aperture of said shutter blades meet in said camera exposure opening to define a low-speed, large-aperture-size exposure, and said shutter blades being also simultaneously moved in a reverse direction from said neutral position to said second exposure position in which said relatively small apertures meet in said camera exposure opening to define a high-speed, small-aperture-size exposure; means for biasing said first and second shutter blades to maintain them in said neutral position; means for simultaneously actuating said first and second shutter blades against said bias means so as to move them selectively to said first exposure position or second exposure position and simultaneously release them to said neutral position; and means for guiding said first and second shutter blades during the movement thereof.

2. A shutter as set forth in claim 1, wherein said actuating means comprises a reversibly rotatable member having an engaging portion and a pivotable transmission member connected to said first and second shutter blades, part of said transmission member existing in a rotational track of said engaging portion so as to simultaneously move said first and second shutter blades from said neutral position to either said first exposure position or said second exposure position.

3. A shutter as set forth in claim 2, wherein said actuating means further comprises a reversible motor for reversibly rotating said rotatable member.

4. A shutter as set forth in claim 2, wherein said pivotable transmission member is biased towards said neutral position by said bias means comprising a coil spring wound around a shaft about which said transmission member pivotably rotates, said spring having extensions which cooperate to resiliently nip both a pin provided on said transmission member and a pin secured to a camera base so as to align both of said pins in a radial direction with respect to said pivot shaft.

5. A shutter as set forth in claim 2, wherein said pivotable transmission member is reciprocally rotatable about an axis within a certain angle stroke between said first exposure position and said second exposure position, one and the other ends thereof with respect to said axis being pivotably connected to said first and second shutter blades, respectively, so that said first and second shutter blades are simultaneously moved to in opposite directions.

6. A shutter as set forth in claim 2 further comprising a synchronizing switch adapted to operate a electronic flash device, said switch being closed by said pivotable transmission member due to the movement thereof from a neutral position to said first exposure position at which low-speed, large-aperture-size exposure is exerted.

7. A shutter as set forth in claim 2, wherein said reversibly rotatable member rotates substantially one full rotation in each photographing cycle in either direction in accordance with the photographing mode automatically or manually set.

8. An exposure control shutter of a camera having an exposure opening, wherein said shutter comprises: first and second plane shutter blades, each shutter blade having a relatively large aperture and a relatively small aperture, said shutter blades being disposed one on top of the other and being slidingly movable with respect to each other from a neutral position to either a first exposure position or a second exposure position, said shutter blades cooperating to close said camera exposure opening in said neutral position, said shutter blades being simultaneously moved in one direction and in then the opposite direction, from said neutral position to said first exposure position in which said relatively large apertures of said shutter blades meet in said camera exposure opening to define a low-speed, large-aperture-size exposure, and said shutter blades being also simultaneously moved in a reverse direction from said neutral position to said second exposure position in which said relatively small apertures meet in said camera exposure opening to define a high-speed, small-aperture-size exposure;

means for biasing said first and second shutter blades to maintain them in said neutral position;

means for simultaneously actuating said first and second shutter blades against said bias means so as to move them selectively to said first exposure position or said second exposure position and simultaneously release them to said neutral position;

means for guiding said first and second shutter blades during the movement thereof, said actuating means comprising a reversibly rotatable member, a driven member connected to said rotatable member through a resilient member and having an engaging portion, and a pivotable transmission member connected to said first and second shutter blades, part of said transmission member existing in a rotational track of said engaging portion so as to simultaneously move said first and second shutter blades from said neutral position to either said first exposure position or said second exposure position;

means for stopping said driven member before said engaging portion engages with said transmission member so as to accumulate the bias force of said resilient member; and means for releasing said driven member after said resilient member accumulates enough bias force to allow said driven member to rapidly move.

9. A shutter as set forth in claim 8, wherein said driven member is coaxially and rotatably mounted on said rotatable member and said resilient member connecting said driven member to said rotatable member is a spring which resiliently nips two projections together, one projection being provided on said driven member and the other projection being provided on said rotatable member, so that said spring can be enlarged to accumulate a bias force when said driven member is stopped by said stopping means while said rotatable member is rotating.

10. A shutter as set forth in claim 9, wherein said rotatable member comprises a cam face on the outer periphery thereof which cooperates with a pivotable lever biased so as to contact said cam face and said driven member comprises an outwardly projected portion on the outer periphery thereof, which projected portion is engaged by said lever before the engaging portion of the driven member engages with the transmission member so as to stop the driven member and is disengaged from the lever when the latter is pivotably moved along said cam face so as to allow the driven member to rapidly rotate so as to actuate the transmission member.

11. A shutter as set forth in claim 10, wherein said projected portion of the driven member is provided with an inclined portion so that when the rotatable member rotates toward a low-speed, large-aperture-size exposure position, said pivotable lever escapes from the inclined portion so as not to stop said driven member but allow the driven member to rotate together with the rotatable member.

12. An exposure control shutter of a camera, comprising: a reversibly rotatable member capable of rotating in a forward direction or a reverse direction at a predetermined constant speed; a driven member capable of moving in one direction when said rotatable member rotates in said one direction and moving in the another direction when the rotatable member rotates in said reverse direction; a shutter closing and opening mechanism capable of exerting selectively either of two stages of exposure in accordance with the moving direction of said driven member; means for stopping said driven member at a position before said driven member opens the shutter through said mechanism when said rotatable member rotates in said one direction and for allowing said driven member to move when said rotatable member rotates in said reverse direction; a spring for connecting said driven member to said rotatable member in such a manner that said driven member follows said rotatable member, a bias force being accumulated, when said driven member is stopped, on said spring due to the change of relative positions between said stopped driven member and said rotating rotatable member and said driven member rapidly moving, when said driven member is released, due to the accumulated bias force of the spring; and means for releasing said driven member, when said rotatable member rotates in said one direction by a predetermined value, after the position at which said rotatable member stops said driven member.

13. A shutter as set forth in claim 12, wherein said driven member is coaxially and rotatably mounted on said rotatable member, said spring resiliently nipping two projections together, one projection being provided on said driven member and the other projection being provided on said rotatable member, so that said spring can be enlarged to accumulate a bias force when said driven member is stopped by said stopping means while said rotatable member is rotating.

14. A shutter as set forth in claim 13, wherein said rotatable member comprises a cam face on the outer periphery thereof which cooperates with a pivotable lever biased so as to contact said cam face and said driven member comprises an outwardly projected portion on the outer periphery thereof, which projected portion is engaged by said lever at a position before said driven member opens the shutter so as to stop the driven member when said rotatable member rotates in said one direction and is disengaged from the lever when the latter is pivotaly moved along said cam face so as to allow the driven member to rapidly rotate so as to open the shutter, said projected portion being provided with an inclined portion so that when the rotatable member rotates in said reverse direction said pivotable lever escapes from the inclined portion so as not to stop said driven member but allow the driven member to rotate together with the rotatable member.

* * * * *